United States Patent
Lu et al.

(10) Patent No.: US 7,071,966 B2
(45) Date of Patent: Jul. 4, 2006

(54) METHOD OF ALIGNING LENS AND SENSOR OF CAMERA

(75) Inventors: Jih-Yung Lu, Taipei Hsien (TW); Chih-Po Yang, Taipei (TW); Chih-Ching Chen, Taipei (TW)

(73) Assignee: BenQ Corporation, Tao-Yuan Hsien (TW)

(*) Notice: Subject to any disclaimer, the term of this patent is extended or adjusted under 35 U.S.C. 154(b) by 600 days.

(21) Appl. No.: 10/460,790

(22) Filed: Jun. 13, 2003

(65) Prior Publication Data

US 2004/0252195 A1 Dec. 16, 2004

(51) Int. Cl.
 *H04N 5/225* (2006.01)
(52) U.S. Cl. ...................................... 348/188
(58) Field of Classification Search ........ 348/180–194; 356/139.03
See application file for complete search history.

(56) References Cited

U.S. PATENT DOCUMENTS

| | | | | |
|---|---|---|---|---|
| 3,912,396 A * | 10/1975 | Hartmann | ............... | 356/124.5 |
| 4,457,017 A * | 6/1984 | Onogi et al. | ............... | 382/295 |
| 4,591,901 A * | 5/1986 | Andrevski | ............... | 348/337 |
| 4,803,557 A * | 2/1989 | Bridges | ............... | 348/374 |
| 5,267,043 A * | 11/1993 | Rottner et al. | ............... | 348/104 |
| 5,303,023 A * | 4/1994 | Portney et al. | ............... | 356/124.5 |
| 5,559,556 A * | 9/1996 | Kagebeck | ............... | 348/374 |
| 5,699,440 A * | 12/1997 | Carmeli | ............... | 382/100 |
| 5,828,409 A * | 10/1998 | North et al. | ............... | 348/374 |
| 6,117,193 A * | 9/2000 | Glenn | ............... | 29/25.01 |
| 6,160,628 A * | 12/2000 | Inoue | ............... | 356/500 |
| 6,195,159 B1 * | 2/2001 | MacDonald et al. | ............... | 356/123 |
| 6,724,429 B1 * | 4/2004 | Shore et al. | ............... | 348/373 |
| 6,760,096 B1 * | 7/2004 | Kitabayashi et al. | ............... | 356/124 |
| 2003/0227615 A1 * | 12/2003 | Montgomery et al. | . | 356/139.03 |

FOREIGN PATENT DOCUMENTS

JP 58-161842 * 9/1983

* cited by examiner

*Primary Examiner*—Paulos M. Natnael
(74) *Attorney, Agent, or Firm*—Winston Hsu

(57) ABSTRACT

A method for aligning a lens of a camera with a sensor of the camera. The method includes positioning a test object a predetermined distance away from the lens of the camera, photographing the test object with the camera to produce image data, and outputting the image data from the camera to a calibration device. The method also includes dividing the image data into a plurality of sections, calculating resolution data for at least two sections of the image data, calculating position parameters of the lens according to the resolution data, and correcting alignment of the lens with respect to the sensor according to the position parameters.

20 Claims, 6 Drawing Sheets

METHOD OF ALIGNING LENS AND SENSOR OF CAMERA

CROSS REFERENCE TO RELATED APPLICATIONS

BACKGROUND OF INVENTION

1. Field of the Invention

The present invention relates to a method for aligning a lens of a camera, and more specifically, to a method of aligning a lens and a sensor of a camera through the use of resolution data.

2. Description of the Prior Art

When assembling a camera, alignment of the lens is extremely important. For example, in a digital camera, the lens must be aligned with a sensor of the camera, such as a charge-coupled device (CCD). If the lens is not properly aligned with the sensor, pictures produced by the camera will be misaligned and some parts may be out of focus.

To solve this problem, many alignment methods are currently used to detect the alignment of the lens with respect to the sensor of the camera. In U.S. Pat. No. 6,117,193 entitled "Optical Sensor Array Mounting and Alignment", Glenn teaches a method for aligning a lens and a sensor of a camera, which is herein incorporated by reference.

Please refer to FIG. 1. FIG. 1 is a perspective view of a lens alignment system according to the prior art. A two-dimensional chart 10 is used as a test image for aligning a lens 14 with a sensor 20 of a camera. The sensor 20 is mounted on a circuit board 18, and a lens holder 16 is used for fixing the lens 14 with respect to the sensor 20. A pattern 12 is drawn on the chart 10 for aiding with the alignment of the lens 14. After placing the lens 14 in the lens holder 16, a photograph of the chart 10 is taken for aligning the lens 14 with the sensor 20. Positions of various points in the pattern 12 appearing in the picture are compared to expected positions of the pattern 12. By comparing the actual positions with the expected positions and by analyzing focus data, alignment of the lens 14 can be detected for the x, y, and z directions.

SUMMARY OF INVENTION

It is therefore a primary objective of the claimed invention to provide a method of aligning a lens of a camera with a sensor of the camera in order to solve the above-mentioned problems.

According to the claimed invention, a method for aligning a lens of a camera with a sensor of the camera is disclosed. The method includes positioning a test object a predetermined distance away from the lens of the camera, photographing the test object with the camera to produce image data, and outputting the image data from the camera to a calibration device. The method also includes dividing the image data into a plurality of sections, calculating resolution data for at least two sections of the image data, calculating position parameters of the lens according to the resolution data, and correcting alignment of the lens with respect to the sensor according to the position parameters.

It is an advantage of the claimed invention that resolution data is used for calculating position parameters of the lens. The resolution data provides precise information regarding the alignment of the lens with respect to the sensor of the camera, allowing better alignment to be achieved.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 2:
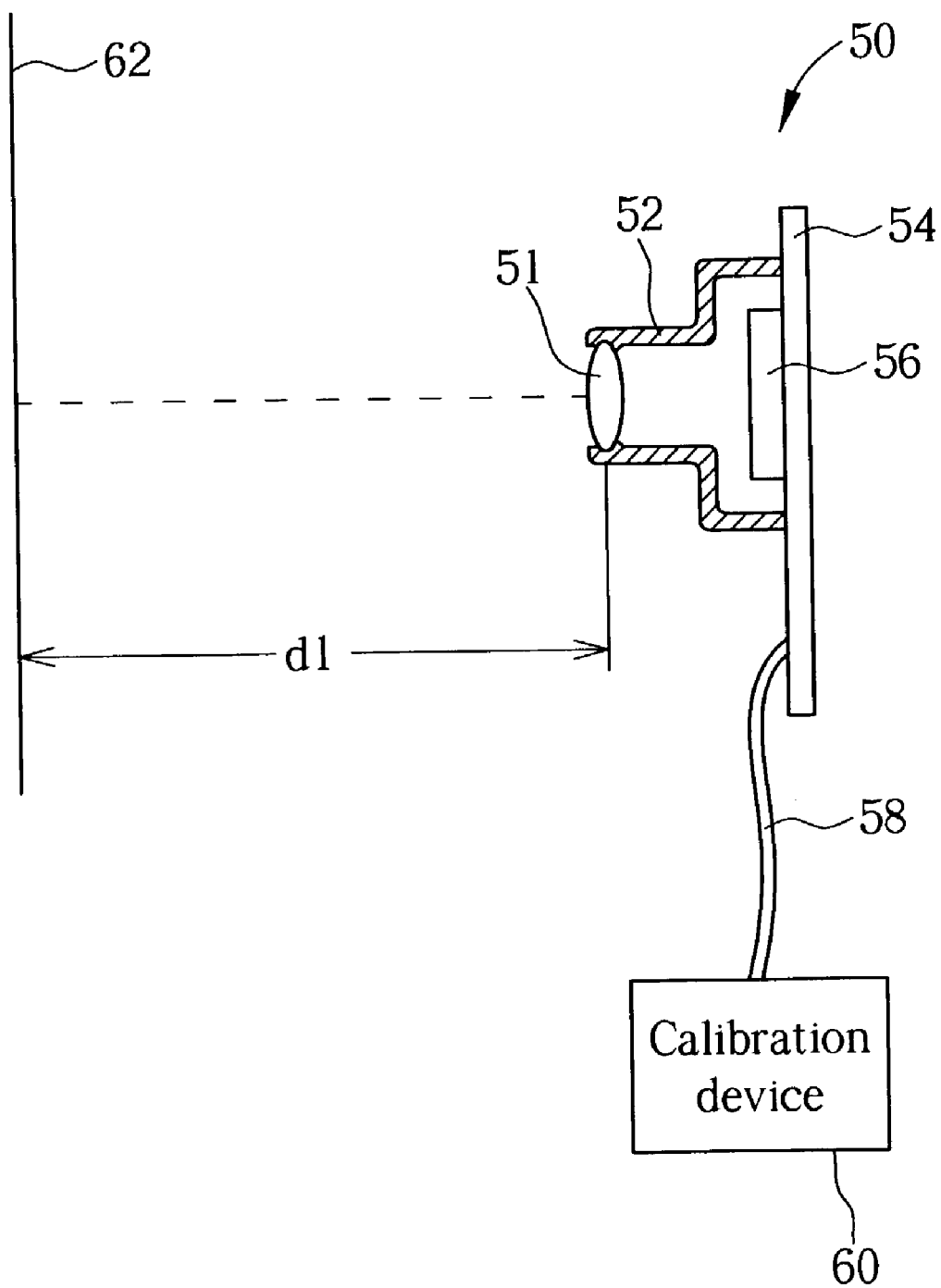
FIG. 2 is a diagram of a lens alignment system according to a preferred embodiment of the present invention.
Figure 3:
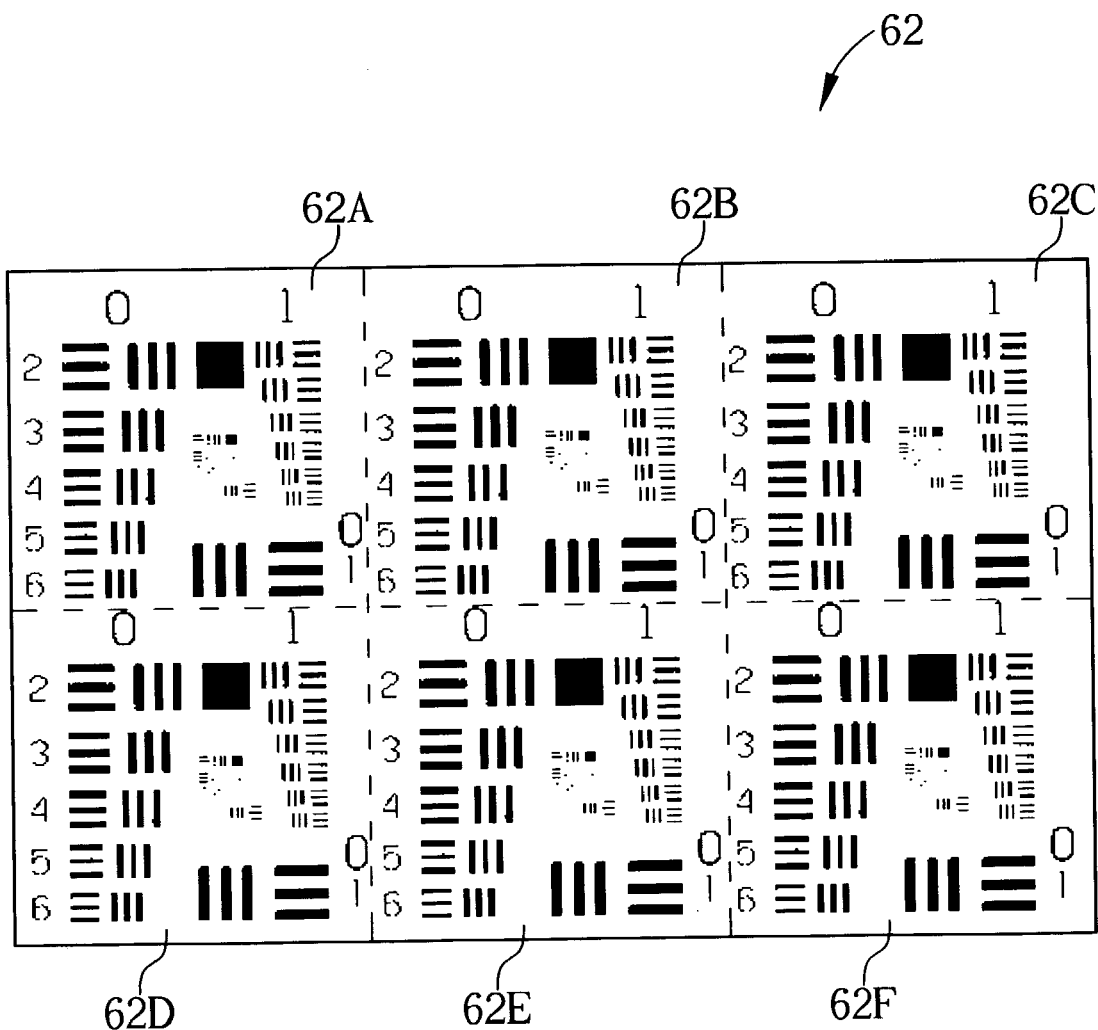
FIG. 3 is a diagram of a resolution chart used in the present invention aligning method.

Please refer to FIG. 2 and FIG. 3. FIG. 2 is a diagram of a lens alignment system according to a preferred embodiment of the present invention. FIG. 3 is a diagram of a resolution chart 62 used in the present invention aligning method. In FIG. 2, a partial internal structure of a camera 50 is shown. The camera 50 contains a circuit board 54, such as a printed circuit board (PCB), for holding all circuitry of the camera 50. A sensor 56 is formed on the circuit board 54 for receiving images from a lens 51 and for converting the images into image data. For example, if the camera 50 is a digital camera, the sensor 56 can be a charge-coupled device (CCD). A lens holder 52 is used for holding the lens 51 in place with respect to the sensor 56, and the lens holder 52 may be mounted directly on the circuit board 54. For properly aligning the lens 51 with the sensor 56, position of the lens 51 can be adjusted slightly when the lens 51 is resting in the lens holder 52.

During the alignment process, a photograph is taken of the resolution chart 62, which is placed at a distance d1 away from the lens 51 of the camera 50. When a photograph of the resolution chart 62 is taken, the sensor 56 produces image data and sends the image data to a calibration device 60 through a wire 58 connected to the circuit board 54. The two-dimensional resolution chart 62 is divided into a plurality of sections 62A–62F, and resolution data corresponding to each section 62A–62F can be produced from pictures taken by the camera 50 of the resolution chart 62. The resolution data can be calculated using a Modulation Transfer Function (MTF) or calculated in terms of TV resolution, both of which are well known to those skilled in the art.

By taking photographs of the resolution chart 62, the calibration device 60 can generate resolution data for analyzing the alignment of the lens 51. Once the alignment of the lens 51 with respect to the sensor 56 is known, position of the lens 51 can be corrected by either a technician or by the calibration device 60 according to the results calculated from the resolution data. This process may be repeated iteratively if necessary until the lens 51 is properly aligned with the sensor 56 of the camera 50.

From the resolution data corresponding to each of the sections 62A–62F of the resolution chart 62, the calibration device 60 is able to calculate position data including linear translation in the x, y, and z directions as well as rotation in the $\theta_x$, $\theta_y$, and $\theta_z$ directions. For example, if resolution data corresponding to sections 62A and 62D indicates higher resolution than the resolution data corresponding to sections 62C and 62F, then the lens 51 may be rotated slightly in the $\theta_y$ direction. The calibration device 60 will detect this rotation, and correct it accordingly.

Figure 4:
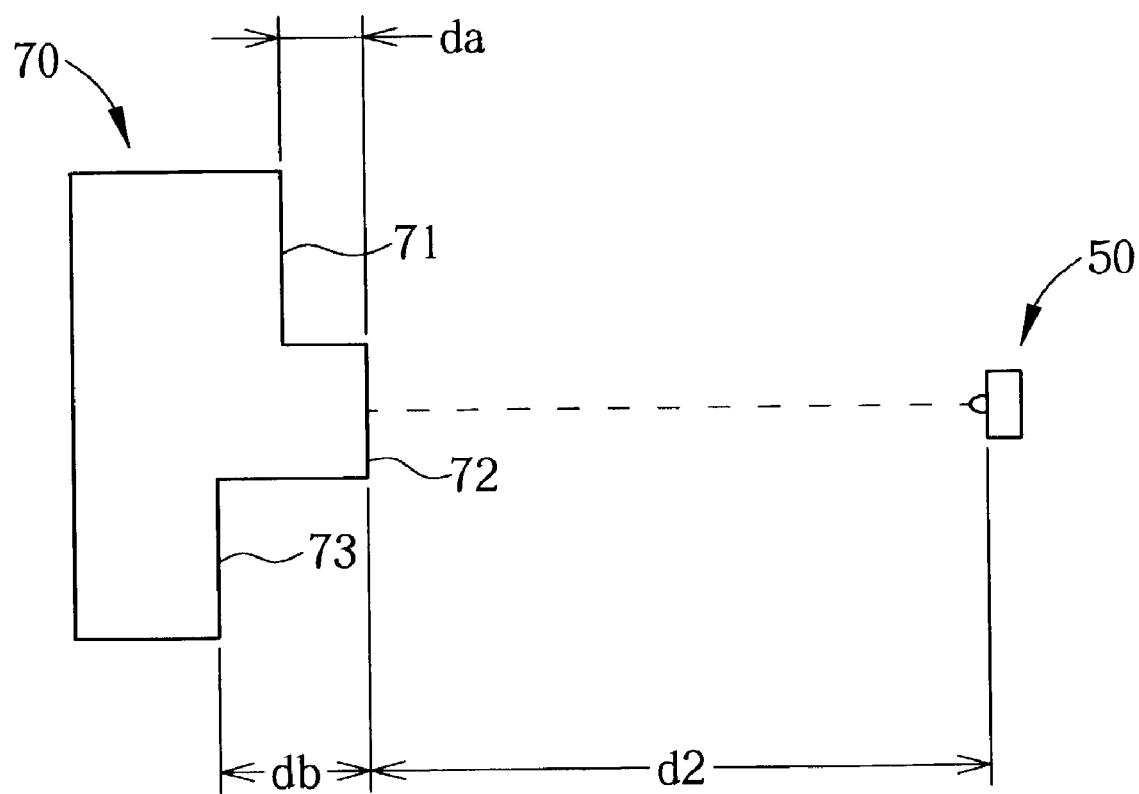
FIG. 4 is a side view of a three-dimensional object according to a second embodiment of the present invention.
Figure 5:
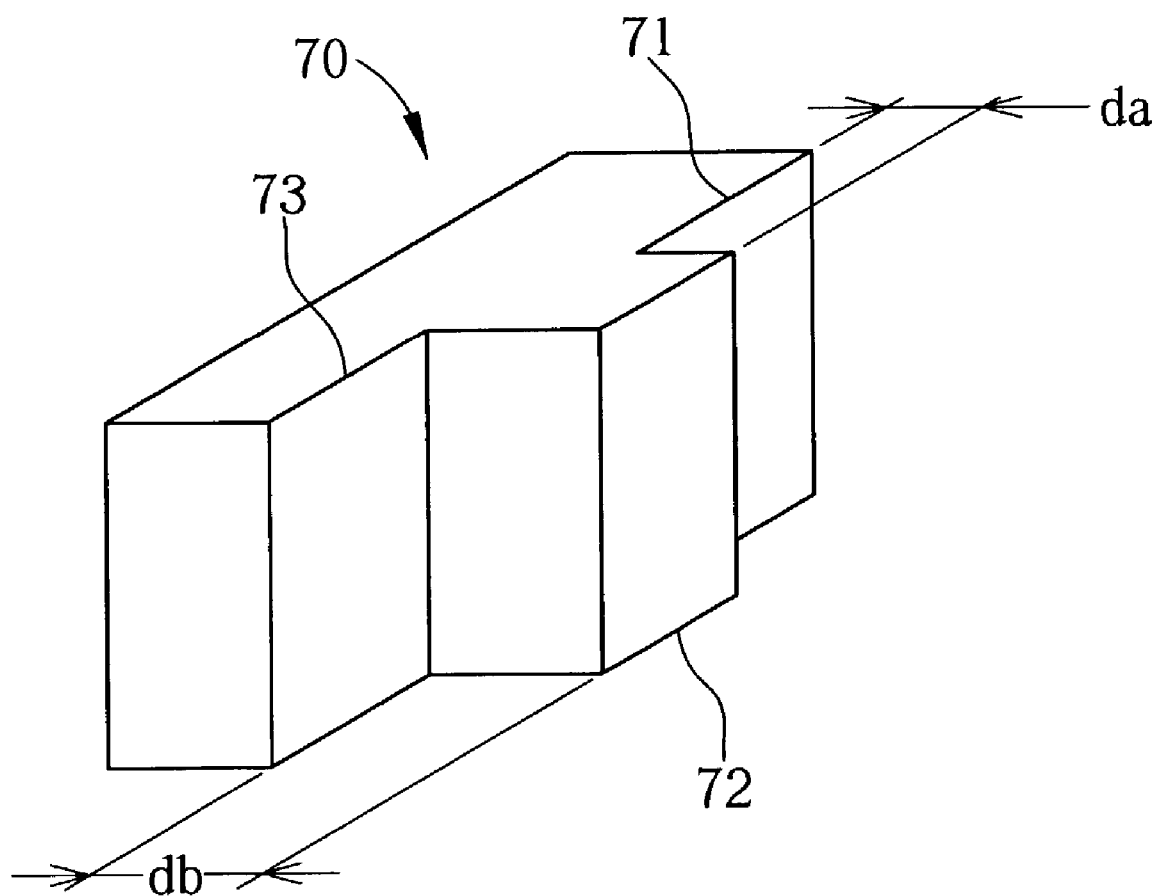
FIG. 5 is a perspective view of the three-dimensional object.

Please refer to FIG. 4 and FIG. 5. FIG. 4 is a side view of a three-dimensional object 70 used for aligning the lens 51 with the sensor 56 of the camera 50, according to a second embodiment of the present invention. FIG. 5 is a perspective view of the three-dimensional object 70. The three-dimensional object 70 is used instead of the two-dimensional resolution chart 62 shown in FIG. 2 for aligning the lens 51 and the sensor 56. The three-dimensional object 70 has faces 71, 72, 73 at different distances away from the lens 51 of the camera 50 for providing a variety of different resolution data. Face 72 is located at a distance d2 away from the lens 51 of the camera 50. As shown in FIG. 4, face 71 is a distance da from face 72, and face 73 is a distance db from face 72. If desired, each of the faces 71, 72, 73 may contain resolution charts for providing additional resolution data.

Figure 1:
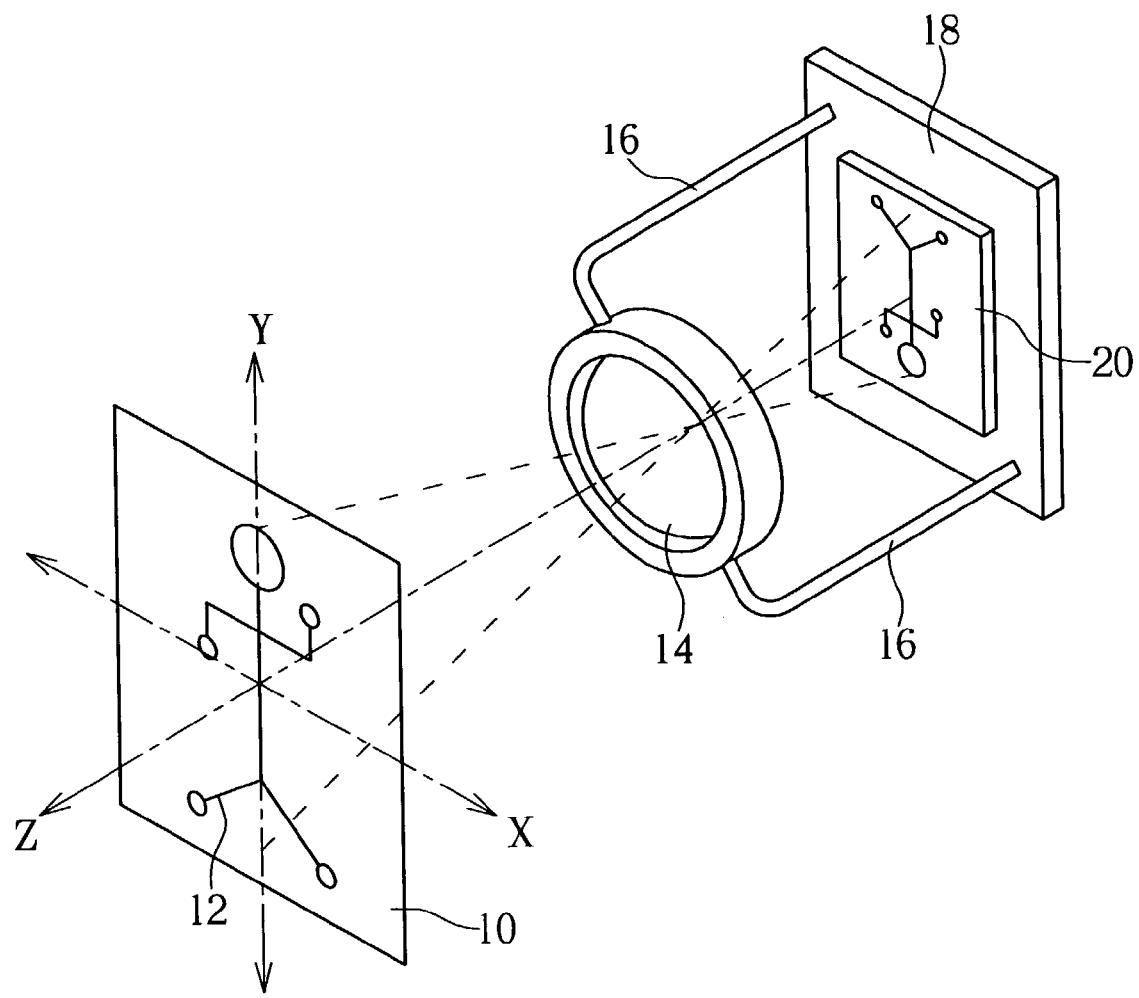
FIG. 1 is a perspective view of a lens alignment system according to the prior art.
Figure 6:
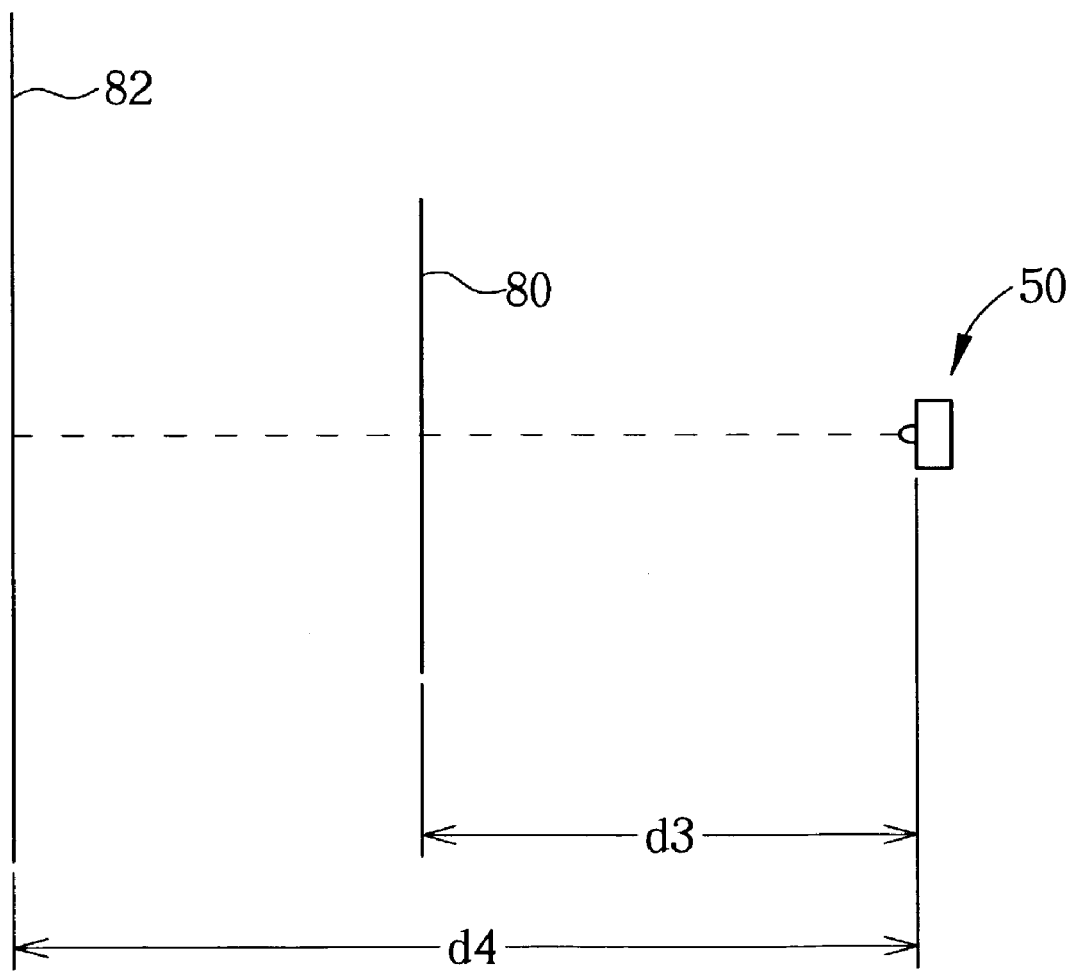
FIG. 6 is a diagram of first and second resolution charts according to a third embodiment of the present invention.

Please refer to FIG. 6. FIG. 6 is a diagram of first and second resolution charts 80 and 82 used for aligning the lens 51 with the sensor 56 of the camera 50, according to a third embodiment of the present invention. The first and second resolution charts 80 and 82 are each similar to the resolution chart 62 shown in FIG. 1 and FIG. 2. The first resolution chart 80 is a distance d3 away from the lens 51 of the camera 50, and the second resolution chart 82 is a distance d4 away from the lens 51. The first and second resolution charts 80 and 82 have geometrically similar sizes, with the length of each chart being directly proportional to the distance from the chart to the lens 51 of the camera 50. For example, distance d4 is roughly twice the length of distance d3, and the length the second resolution chart 82 is roughly twice the length of the first resolution chart 80.

According to the third embodiment of the present invention, the camera 50 takes a first photograph of the first resolution chart 80. Then the first resolution chart 80 is moved, and the camera 50 then takes a second photograph of the second resolution chart 82. Image data from the first and second photographs are fed to the calibration device 60, and the calibration device 60 computes resolution data from the image data. Just as in the preferred embodiment, each of the first and second resolution charts 80 and 82 can be divided into a plurality of sections. The advantage of using a greater number of two-dimensional resolution charts instead of a single resolution chart is that more resolution data can be collected from different distances, allowing better alignment information to be calculated.

Compared to the prior art method of aligning the lens with the sensor of a camera, the present invention alignment method analyzes resolution data for calculating position parameters of the lens. The resolution data provides precise information regarding the alignment of the lens with respect to the sensor of the camera, allowing better alignment to be achieved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of aligning a lens of a camera with a sensor of the camera, the method comprising:
    positioning a test object a predetermined distance away from the lens of the camera;
    photographing the test object with the camera to produce image data;
    outputting the image data from the camera to a calibration device;
    dividing the image data into a plurality of sections;
    calculating resolution data for at least two sections of the image data;
    calculating position parameters of the lens according to the resolution data; and
    correcting alignment of the lens with respect to the sensor according to the position parameters.

2. The method of claim 1 wherein the position parameters include translation and rotation parameters.

3. The method of claim 2 wherein the translation parameters include linear translation in the x, y, and z directions and the rotation parameters include rotation in the $\theta_x$, $\theta_y$, and $\theta_z$ directions.

4. The method of claim 1 wherein correcting alignment of the lens with respect to the sensor includes using the calibration device to correct alignment of the lens with respect to the sensor according to the position parameters.

5. The method of claim 1 wherein the test object is a resolution chart.

6. The method of claim 1 wherein the test object is a three-dimensional object.

7. The method of claim 6 wherein the test object comprises at least two faces at different distances away from the lens of the camera.

8. The method of claim 7 wherein each of the faces further comprises resolution charts for providing additional resolution data.

9. The method of claim 1 wherein the camera is digital camera.

10. The method of claim 1 wherein the resolution data is calculated using a Modulation Transfer Function (MTF).

11. The method of claim 1 wherein the resolution data is calculated in terms of TV resolution.

12. A method of aligning a lens of a camera with a sensor of the camera, the method comprising:
    positioning a first test object a first predetermined distance away from the lens of the camera;
    photographing the first test object with the camera to produce first image data;
    positioning a second test object a second predetermined distance away from the lens of the camera;
    photographing the second test object with the camera to produce second image data;
    outputting the first and second image data from the camera to a calibration device;
    dividing each of the first and second image data into a plurality of sections;
    calculating resolution data for at least two sections of each of the first and second image data;
    calculating position parameters of the lens according to the resolution data; and
    correcting alignment of the lens with respect to the sensor according to the position parameters.

13. The method of claim 12 wherein the first and second test objects have geometrically similar shapes and different sizes, a length of each of the objects being directly proportional to the distance away from the lens of the camera.

14. The method of claim 12 wherein the position parameters include translation and rotation parameters.

15. The method of claim 14 wherein the translation parameters include linear translation in the x, y, and z directions and the rotation parameters include rotation in the $\theta_x$, $\theta_y$, and $\theta_z$ directions.

16. The method of claim 12 wherein correcting alignment of the lens with respect to the sensor includes using the calibration device to correct alignment of the lens with respect to the sensor according to the position parameters.

17. The method of claim 12 wherein the test object is a resolution chart.

18. The method of claim 12 wherein the camera is digital camera.

19. The method of claim 12 wherein the resolution data is calculated using a Modulation Transfer Function (MTF).

20. The method of claim 12 wherein the resolution data is calculated in terms of TV resolution.

* * * * *